United States Statutory Invention Registration [19]

[11] Reg. Number: H901

Eckart et al. [43] Published: Mar. 5, 1991

[54] METHOD OF IDENTIFYING THE COMPOSITION OF A MATERIAL SAMPLE

[75] Inventors: Donald W. Eckart, Wall; Joel R. Shappirio, Ocean, both of N.J.

[73] Assignee: The United States of America as represented by the Secretary of the Army, Washington, D.C.

[21] Appl. No.: 406,930

[22] Filed: Sep. 13, 1989

[51] Int. Cl.[5] ..... G01N 31/00
[52] U.S. Cl. ..... 250/304
[58] Field of Search ..... 250/304

[56] References Cited

PUBLICATIONS

"Introduction to X-Ray Spectrometric Analysis", Eugene Bertin, Plenum Press, 1978, 405, 6, 419–423.

*Primary Examiner*—Michael Carone

*Attorney, Agent, or Firm*—Michael Zelenka; Roy E. Gordon

[57] ABSTRACT

A material sample is rubbed with an abrasive material until streaking appears in the abrasive indicating that the material sample has become embedded in the abrasive and the abrasive material then analyzed using qualitative and quantitative chemical analysis.

5 Claims, No Drawings

---

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF IDENTIFYING THE COMPOSITION OF A MATERIAL SAMPLE

The invention described herein may be manufactured, used, and licensed by or for the Government for governmental purposes without the payment to us of any royalty thereon.

This invention relates in general to a method of identifying the composition of a material sample, and in particular, to such a method when the material sample is in a remote location.

BACKGROUND OF THE INVENTION

Certain material samples useful in microelectronics and other disciplines can be exceedingly sensitive to the rigors of transportation including damage and contamination. Modern assay methods require sophisticated analysis tools, often at a remote location. A method is therefore needed for identification of a material sample that permits safe shipment, without contamination, for analysis

SUMMARY OF THE INVENTION

The general object of this invention is to provide a method of identifying a material sample, particularly when the material sample is in a remote location. A more particular object of the invention is to provide such a method that permits safe shipment of the material sample, without contamination, for identification.

It has now been found that the aforementioned objectives can be attained by rubbing the material sample with an abrasive material until streaking appears in the abrasive indicating that the material sample has become embedded in the abrasive material and then analyzing the abrasive material using qualitative and quantitative chemical analysis.

More particularly, according to the invention the sample material is rubbed with an abrasive coated paper or cloth such as emery paper until streaking appears on the emery paper. The emery paper is then analyzed in the laboratory for the composition of the material sample embedded within it by a method such as energy dispersive x-ray spectroscopy (EDS). Because analytical techniques such as EDS can perform qualitative and quantitative chemical analysis on very small quantities of sample down to micron or submicron dimensions, it is necessary to have only a representative sampling of the material sample in question. The emery paper accomplishes this sampling by containing the sample material because it is embedded in the abrasive material even during transportation.

The emery paper may be glued to the standard sample holder used in the EDS system for ease of handling.

The types of sample materials that can be analyzed include plating on metals, metals, corrosion products, coatings, residues, glasses, ceramics, minerals, and ores.

It is also noted that the method of the invention allows the identification of a sample material in a remote location without having to ship the sample material to a laboratory or to take the sample material apart.

DESCRIPTION OF THE PREFERRED EMBODIMENT

Metal shelter bolts are being used as electrical grounds in the field at a remote location. The specification calls for the bolts to be plated with nickel. As the bolts are becoming corroded, it is felt that they might not be plated with nickel. It is further felt unsafe to send chemical kits for chemical analysis into the field. Therefore, the plated bolts are rubbed with emery paper until streaking occurs in the emery paper indicating that the sample of plated bolt is imbedded in the emery paper. The emery paper is sent to the laboratory and found by EDS to contain cadmium and no nickel.

We wish it to be understood that we do not desire to be limited to the exact details of construction shown and described for obvious modifications will occur to a person skilled in the art.

What is claimed is:

1. Method of identifying the composition of a material sample comprising rubbing the material sample with an abrasive material until streaking appears in the abrasive material indicating that the material sample has become embedded in the abrasive material, and then analyzing the abrasive material using qualitative and quantitative chemical analysis.

2. Method according to claim 1 wherein the abrasive material is an abrasive coated paper.

3. Method according to claim 2 wherein the abrasive coated paper is emery paper.

4. Method according to claim 1 wherein the abrasive material is an abrasive coated cloth.

5. Method according to claim 3 wherein the analysis is made by x-ray spectroscopy (EDS).

* * * * *